US012710723B2

(12) United States Patent
Ishikawa et al.

(10) Patent No.: US 12,710,723 B2
(45) Date of Patent: Aug. 18, 2026

(54) IMAGE FORMING APPARATUS TO SELECTIVELY SUPPLY AIR TO STATIONS INCLUDING IMAGE FORMING UNITS

(71) Applicants: Taisuke Ishikawa, Kanagawa (JP); Shoji Asanuma, Kanagawa (JP); Tatsuya Suzuki, Kanagawa (JP)

(72) Inventors: Taisuke Ishikawa, Kanagawa (JP); Shoji Asanuma, Kanagawa (JP); Tatsuya Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/068,268

(22) Filed: Mar. 3, 2025

(65) Prior Publication Data

US 2025/0291313 A1 Sep. 18, 2025

(30) Foreign Application Priority Data

Mar. 14, 2024 (JP) ................................ 2024-039533

(51) Int. Cl.

| | |
|---|---|
| ***G03G 21/00*** | (2006.01) |
| ***G03G 21/16*** | (2006.01) |
| ***G03G 21/20*** | (2006.01) |

(52) U.S. Cl.

CPC ....... *G03G 21/206* (2013.01); *G03G 21/1619* (2013.01); *G03G 2221/1645* (2013.01)

(58) Field of Classification Search

None

See application file for complete search history.

(56) References Cited

U.S. PATENT DOCUMENTS

| | | | | |
|---|---|---|---|---|
| 12,461,481 | B2 * | 11/2025 | Takayama .......... | G03G 21/1633 |
| 2012/0230720 | A1 | 9/2012 | Murano | |
| 2014/0212164 | A1 * | 7/2014 | Miyagawa ........... | G03G 21/206 399/92 |
| 2019/0278222 | A1 | 9/2019 | Ishikawa | |
| 2020/0301349 | A1 | 9/2020 | Ishikawa et al. | |
| 2021/0041827 | A1 | 2/2021 | Murano et al. | |
| 2021/0041828 | A1 | 2/2021 | Ishimitsu et al. | |
| 2021/0096508 | A1 | 4/2021 | Ishikawa et al. | |

(Continued)

FOREIGN PATENT DOCUMENTS

| | | |
|---|---|---|
| JP | 2003066675 A | 3/2003 |
| JP | 2003066685 A | 3/2003 |

(Continued)

*Primary Examiner* — Sophia S Chen

(74) *Attorney, Agent, or Firm* — Harness, Dickey & Pierce, P.L.C.

(57) ABSTRACT

An image forming apparatus includes a plurality of image forming units, a plurality of stations, a plurality of air supply ports, and an air supply duct. When image formation is performed in a full specification state in which all of the image forming units are installed in the stations, air is supplied from all of the air supply ports to all of the stations. When image formation is performed in a specified specification state in which a station to be used in which one of the image forming units is installed and an unused station in which none of the image forming units is installed are present, air is supplied to the station to be used from an air supply port corresponding to the station to be used, and air is not supplied to and is not exhausted from the unused station via another air supply port.

8 Claims, 5 Drawing Sheets

(56) References Cited

U.S. PATENT DOCUMENTS

| | | | |
|---|---|---|---|
| 2021/0096509 | A1 | 4/2021 | Ishikawa et al. |
| 2023/0029299 | A1 | 1/2023 | Tanaka et al. |

FOREIGN PATENT DOCUMENTS

| | | | |
|---|---|---|---|
| JP | 2004287216 | A | 10/2004 |
| JP | 2012189814 | A | 10/2012 |
| JP | 2014142471 | A | 8/2014 |
| JP | 2014232130 | A | 12/2014 |
| JP | 2022181145 | A | 12/2022 |

* cited by examiner

IMAGE FORMING APPARATUS TO SELECTIVELY SUPPLY AIR TO STATIONS INCLUDING IMAGE FORMING UNITS

CROSS-REFERENCE TO RELATED APPLICATION

This patent application is based on and claims priority pursuant to 35 U.S.C. § 119 (a) to Japanese Patent Application No. 2024-039533, filed on Mar. 14, 2024, in the Japan Patent Office, the entire disclosure of which is hereby incorporated by reference herein.

BACKGROUND

Technical Field

Embodiments of the present disclosure relate to an image forming apparatus such as a copying machine, a printer, a facsimile machine, or a multifunction peripheral thereof.

Related Art

In an image forming apparatus such as a copier or a printer, a technique has been proposed that can perform image forming (printing) in a state where only one image forming unit is installed and the other image forming units are not installed in a space where a plurality of image forming units can be installed. On the other hand, a technique has also been proposed in which only one imaging unit for black is installed in a space in which four imaging units (image forming units) can be installed. When printing is performed, a shielding member is installed between the space and a cooling fan. Air is exhausted from between the cooling fan and the shielding member through a ventilation path disposed to communicate with a lower portion of the space.

SUMMARY

In an embodiment of the present disclosure, an image forming apparatus includes a plurality of image forming units, a plurality of stations, a plurality of air supply ports, an air supply duct, a plurality of exhaust ports, and an exhaust duct. The plurality of image forming units are attachable to and detachable from the plurality of stations. Air is supplied to the plurality of stations through the plurality of air supply ports. The air supply duct causes air taken from an outside of a body of the image forming apparatus to flow toward the plurality of air supply ports. Air is exhausted from the plurality of stations through the plurality of exhaust ports. The exhaust duct causes air exhausted from the plurality of air exhaust ports to flow toward the outside of the body of the image forming apparatus. When image formation is performed in a full specification state in which all of the plurality of image forming units are installed in the plurality of stations, air is supplied from all of the plurality of air supply ports to all of the plurality of stations. When image formation is performed in a specified specification state in which a station to be used in which one of the plurality of image forming units is installed and an unused station in which none of the plurality of image forming units is installed are present among the plurality of stations, air is supplied to the station to be used from an air supply port corresponding to the station to be used among the plurality of air supply ports, air is not supplied to the unused station via another air supply port among the plurality of air supply ports, and air is not exhausted from the unused station via the other air supply port.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
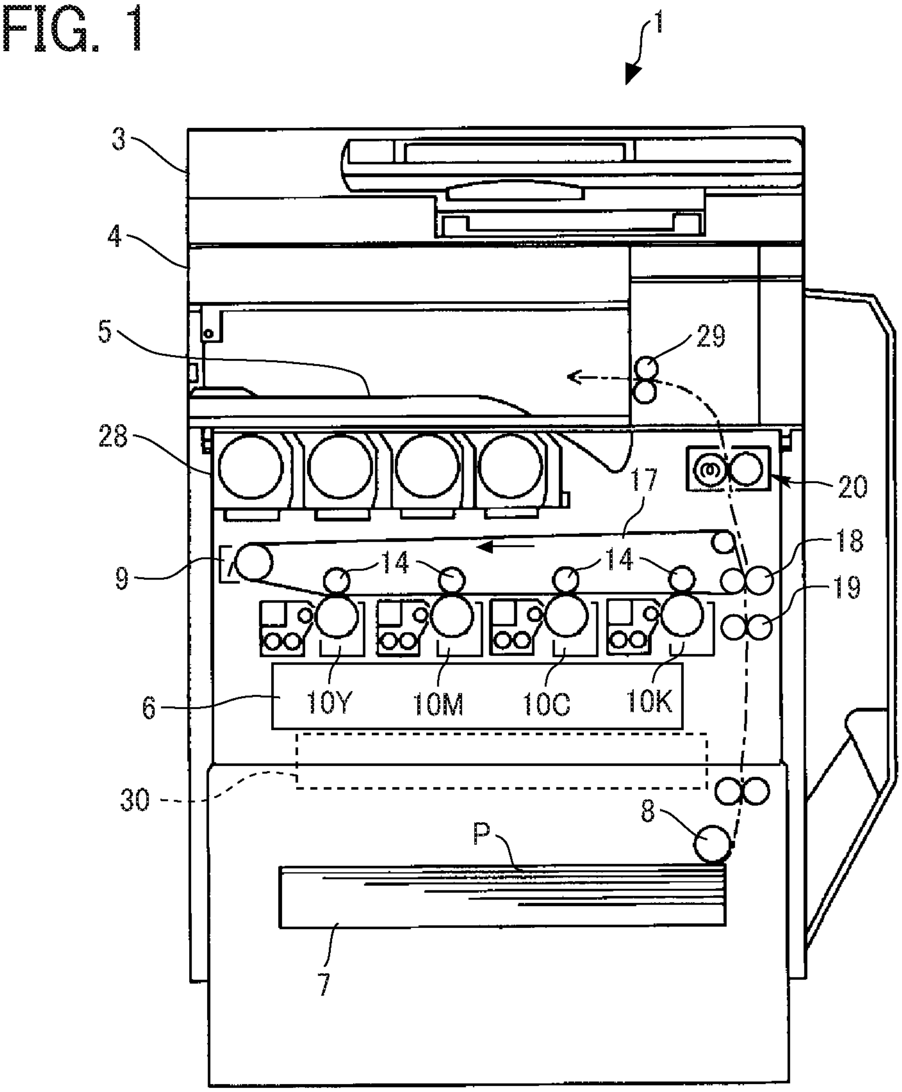
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

A description is given below of an overall configuration and operation of an image forming apparatus 1 with reference to FIG. 1. In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans the documents to read image data. The writing device 6 emits a laser beam based on input image data. The image forming apparatus 1 also includes a sheet feeder 7, image forming units 10Y, 10M, 10C, and 10K, an intermediate transfer belt 17, and a secondary transfer roller 18. The sheet feeder 7 stores sheets P such as sheets of paper. The image forming units 10Y, 10M, 10C, and 10K are image forming units to form toner images of yellow, magenta, cyan, and black, respectively. The toner images of multiple colors are transferred and superimposed one on another onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to developing devices 13 of the corresponding image forming units 10Y, 10M, 10C, and 10K (process cartridges). Waste-toner is collected in the waste-toner collection container 30.

Figure 2:
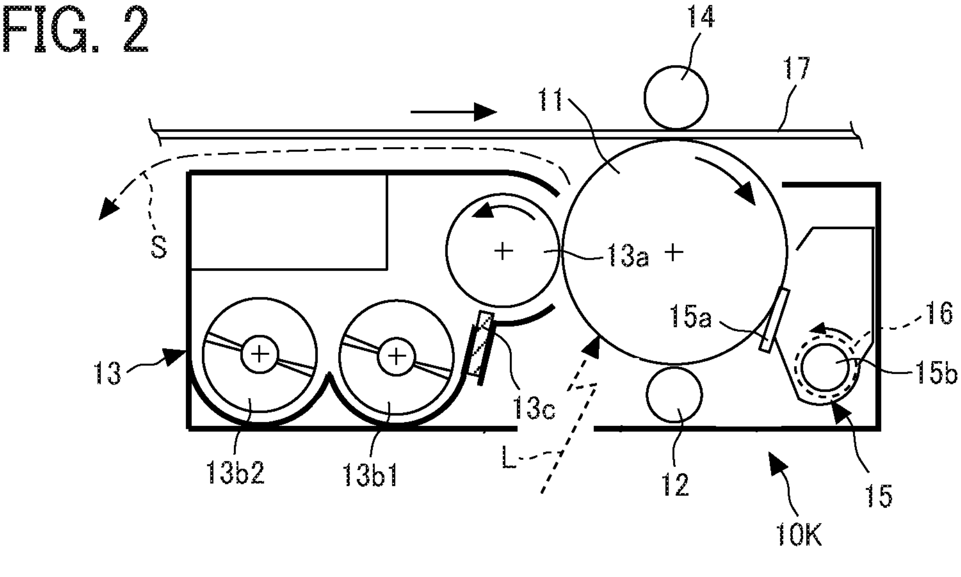
FIG. 2 is a diagram illustrating an image forming unit.

Each of the image forming units 10Y, 10M, 10C, and 10K (the process cartridges) includes a photoconductor drum 11 (serving as an image bearer), a charging device 12, the developing device 13, and a cleaning device 15, which are integrated as a single unit as illustrated in FIG. 2. Each of the image forming units 10Y, 10M, 10C, and 10K, which is expendable, is replaced with a new one when depleted. Yellow, magenta, cyan, and black toner images are formed on the respective photoconductor drums 11 (serving as image bearers) in the image forming units 10Y, 10M, 10C, and 10K.

A description is given below of operations of the image forming apparatus 1 to form a normal color toner image. Conveying rollers of the document conveying device 3 convey a document on a document table onto an exposure glass of the scanner 4. The scanner 4 optically scans the document on the exposure glass to read image data. The yellow, magenta, cyan, and black image data are transmitted to the writing device 6. The writing device 6 irradiates the photoconductor drums 11 of the corresponding image forming units 10Y, 10M, 10C, and 10K with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, the charging device 12 (a charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum 11 is irradiated with the laser beam L. The writing device 6 emits, from a light source, the laser beams L for respective colors according to the image data of respective colors. The laser beams L are reflected by a polygon mirror and transmitted through multiple lenses. The laser beams L transmitted through the multiple lenses pass through different optical paths for the different color components of yellow, magenta, cyan, and black (exposure process).

The laser beam L corresponding to the yellow image data is irradiated to the surface of the photoconductor drum 11 of the first image forming unit 10Y from the left in FIG. 1, to form an electrostatic latent image for yellow thereon. Thus, an electrostatic latent image corresponding to the yellow image data is formed on the photoconductor drum 11 charged by the charging device 12. Similarly, the laser beam L corresponding to the cyan image data is irradiated to the surface of the photoconductor drum 11 of the second image forming unit 10C from the left in FIG. 1, to form an electrostatic latent image for cyan thereon. The laser beam L corresponding to the magenta image data is irradiated to the surface of the photoconductor drum 11 of the third image forming unit 10M from the left in FIG. 1, to form an electrostatic latent image for magenta thereon. The laser beam L corresponding to the black image data is irradiated to the surface of the photoconductor drum 11 of the fourth image forming unit 10K from the left in FIG. 1, to form an electrostatic latent image for black thereon.

Then, the surface of the photoconductor drum 11 bearing the electrostatic latent image for each color reaches the position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Primary transfer rollers 14 are disposed at the positions where the surfaces of the photoconductor drums 11 face the intermediate transfer belt 17 such that the primary transfer rollers 14 contact an inner circumferential surface of the intermediate transfer belt 17. At the positions of the primary transfer rollers 14, the toner images on the photoconductor drums 11 are sequentially transferred and superimposed onto the intermediate transfer belt 17, forming a multicolor toner image thereon (primary transfer process).

After the primary transfer process, the surface of the photoconductor drum 11 reaches the position opposite the cleaning device 15 (see FIG. 2). The cleaning device 15 collects untransferred toner remaining on the photoconductor drum 11 (cleaning process). Then, the surface of the photoconductor drum 11 passes through a charge elimination device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18. The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (a cleaning device for the intermediate transfer belt 17). The intermediate transfer belt cleaner 9 collects the untransferred toner on the intermediate transfer belt 17 to complete a series of transfer processes on the intermediate transfer belt 17.

The sheet P is conveyed from the sheet feeder 7 to the position of the secondary transfer roller 18 via, for example, a sheet conveyance guide and a registration roller pair 19. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor toner image is transferred, is conveyed to a fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image to the exterior of a body of the image forming apparatus 1, and the ejected sheets P are stacked on an output tray 5 to complete a series of image forming processes.

With reference to FIG. 2, a description is given below of the image forming units 10Y, 10M, 10C, and 10K of the image forming apparatus 1 in detail. FIG. 2 is a diagram illustrating a configuration of the image forming unit 10K for black. Each of the other three image forming units 10Y, 10M, and 10C has substantially the same configuration as the image forming unit 10K for black except for the color of toner used in the image forming process, and thus drawings and descriptions thereof are omitted to avoid redundancy.

As illustrated in FIG. 2, the image forming unit 10K is a single unit that includes the photoconductor drum 11 as the image bearer, the charging device 12 to charge the photoconductor drum 11, the developing device 13 to develop an electrostatic latent image on the photoconductor drum 11, and the cleaning device 15 to remove untransferred toner from the photoconductor drum 11 in a casing of the image forming unit 10K.

The photoconductor drum 11 is an organic photoconductor designed to be charged with a negative polarity and includes a photosensitive layer formed on a drum-shaped conductive support. The charging device 12 is a charging roller including a conductive core and an elastic layer of moderate resistivity overlaid on the conductive core. A power supply applies a specified voltage to the charging device 12 (charging roller). Thus, the charging device 12 uniformly charges the surface of the photoconductor drum 11 facing the charging device 12.

The developing device 13 includes a developing roller 13*a* disposed opposite the photoconductor drum 11, a first conveying screw 13*b*1 disposed opposite the developing roller 13*a*, a second conveying screw 13*b*2 disposed opposite the first conveying screw 13*b*1 via a partition, and a doctor blade 13*c* disposed opposite the developing roller 13*a*. The developing roller 13*a* includes multiple magnets and a sleeve that rotates around the magnets. The magnets are stationary and generate magnetic poles around the circumferential surface of the developing roller 13*a*. The magnets generate a plurality of magnetic poles on the developing roller 13*a* (sleeve) to bear developer on the developing roller 13*a*. The developing device 13 stores two-component developer including carrier and toner.

The cleaning device 15 includes a cleaning blade 15*a* that contacts the photoconductor drum 11 and a conveying screw 15*b* (a conveyance tube 16) that conveys the untransferred toner collected in the cleaning device 15 toward a waste-toner conveying device as waste toner. For example, the cleaning blade 15*a* is made of rubber, such as urethane rubber, and contacts the surface of the photoconductor drum 11 at a specified angle with a specified pressure. With such a configuration, substances such as the untransferred toner adhering to the photoconductor drum 11 are mechanically scraped off and collected in the cleaning device 15. The untransferred toner collected in the cleaning device 15 is conveyed to the waste-toner conveying device via the conveyance tube 16 in which the conveying screw 15*b* is disposed and conveyed to the waste-toner collection container 30 by the waste-toner conveying device. The conveyed untransferred toner is collected in the waste-toner collection container 30 as the waste toner. In addition to the untransferred toner, substances adhering to the photoconductor drum 11 or the intermediate transfer belt 17 include, for example, paper dust resulting from the sheet P, discharge products generated on the photoconductor drum 11 during discharge by the charging device 12, and additives to the toner. In the present specification, such substances are collectively referred to as the "untransferred toner."

The image forming processes, described above, are described in further detail below with reference to FIG. 2. The developing roller 13*a* rotates in a direction (counterclockwise) indicated by an arrow in FIG. 2. In the developing device 13, as the first conveying screw 13*b*1 and the second conveying screw 13*b*2 arranged via the partition rotate, the developer is circulated in the longitudinal direction of the developing device 13, while being stirred and mixed with toner supplied from the toner container 28 by a toner supply device. The longitudinal direction of the developing device 13 is perpendicular to the plane on which FIG. 2 is illustrated.

Thus, the toner is triboelectrically charged and attracted to the carrier. The toner is borne on the developing roller 13*a* together with the carrier. The developer borne on the developing roller 13*a* reaches a position opposite the doctor blade 13*c*. After having been adjusted to an appropriate amount at the position of the doctor blade 13*c*, the developer on the developing roller 13*a* then reaches an opposing position to the photoconductor drum 11 (i.e., a development area). In the development area, the toner in the developer adheres to the electrostatic latent image formed on the surface of the photoconductor drum 11. The toner adheres to the electrostatic latent image (i.e., the toner image is formed) by a development electric field formed by a potential difference (i.e., a developing potential) between a latent image potential (i.e., an exposure potential) of an image area irradiated with the laser beam L and a development bias applied to the developing roller 13*a*. Subsequently, most of the toner attached to the photoconductor drum 11 in the development process is transferred onto the intermediate transfer belt 17. The untransferred toner remained on the surface of the photoconductor drum 11 is collected in the cleaning device 15 by the cleaning blade 15*a*.

Figure 3A:
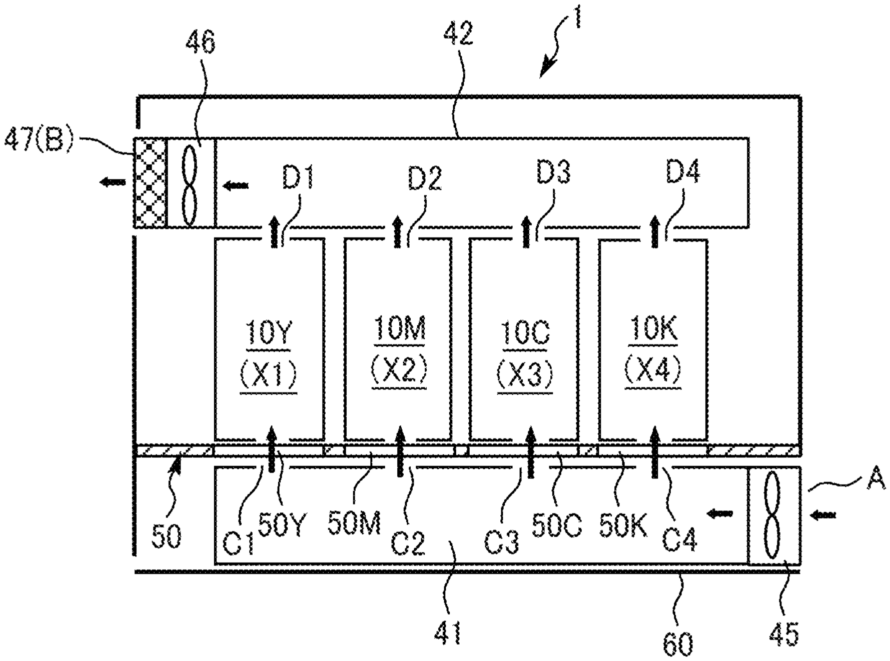
FIG. 3A is a top view of an image forming apparatus in a full specification state, illustrating flows of air therein.
Figure 4A:
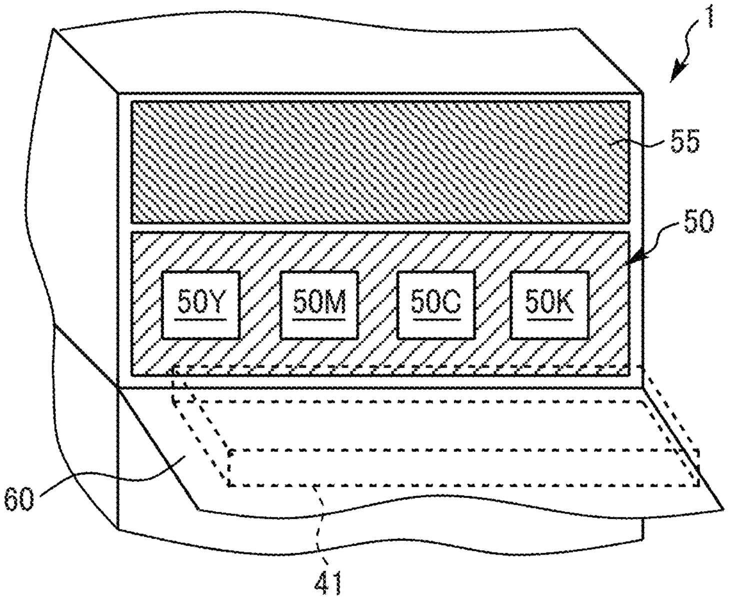
FIG. 4A is a perspective view of an image forming apparatus in which a body door is opened in a full specification state.

The configuration and operation of the image forming apparatus 1 according to the present embodiment are described in further detail below. As described above with reference to FIG. 1, the plurality of image forming units 10Y, 10M, 10C, and 10K are removably installed in the image forming apparatus 1. Specifically, the plurality of image forming units are four image forming units, that is, one image forming unit 10K for black and three image forming units 10Y, 10M, and 10C for colors. With reference to FIGS. 3A and 4A, the image forming apparatus 1 includes a plurality of stations X1, X2, X3, and X4 (installation sections) to which the plurality of image forming units 10Y, 10M, 10C, and 10K are removably installed, respectively. Specifically, the four image forming units 10Y, 10M, 10C, and 10K are attached to or detached from the four stations X1, X2, X3, and X4, respectively. When the image forming units 10Y, 10M, 10C, and 10K are not installed, the four stations X1, X2, X3, and X4 are spaces that are entirely open.

With reference to FIG. 3A, the image forming apparatus 1 includes a flow passage through which air (outside air) taken in from the outside through an inlet port A is caused to flow into a body of the image forming apparatus 1 and is exhausted to the outside of the body of the image forming apparatus 1 through an outlet port B. In other words, flow passages of air (gas) as indicated by black arrows in FIG. 3A are formed in the image forming apparatus 1. The flow passage is for cooling the image forming units 10Y, 10M, 10C, and 10K, collecting toner scattered from the image forming units 10Y, 10M, 10C, and 10K (e.g., the developing devices 13), and collecting ozone generated in the image forming units 10Y, 10M, 10C, and 10K (e.g., the charging devices 12).

The image forming apparatus 1 (flow passage) is provided with, for example, a plurality of (four) air supply ports C1, C2, C3, and C4, an air supply duct 41, an air supply fan 45, a plurality of (four) exhaust ports D1, D2, D3, and D4, an exhaust duct 42, an exhaust fan 46, and a filter 47.

The plurality of air supply ports C1, C2, C3, and C4 enable air supply to the plurality of stations X1, X2, X3, and X4, respectively. The air supply duct 41 is for allowing air taken in from the outside of the body of the image forming apparatus 1 via the inlet port A to flow toward the plurality of air supply ports C1, C2, C3, and C4. Specifically, in the present embodiment, the air supply duct 41 has the four air supply ports C1, C2, C3, and C4 at positions facing the front sides (the lower sides in FIG. 3A and the front sides in the direction perpendicular to the plane on which FIG. 1 is illustrated) of the four image forming units 10Y, 10M, 10C, and 10K, respectively. The air supply duct 41 is provided with the air supply fan 45 upstream (on the right side in FIG. 3A) from the plurality of air supply ports C1, C2, C3, and C4 in the air flow direction. When the air supply fan 45 is driven, the outside air is actively taken into the air supply duct 41 through the inlet port A.

With reference to FIG. 4A, in the present embodiment, an exterior cover 60 that can open the inside of the body of the image forming apparatus 1 is disposed on the front side (the side in which a user mainly operates) of the body of the image forming apparatus 1. When the exterior cover 60 is opened (in the state of FIG. 4A), an inner cover 50 having insertion ports 50Y, 50M, 50C, and 50K for attachment to and detachment from the image forming units 10Y, 10M, 10C, and 10K is exposed. In the present embodiment, the air supply duct 41 (which is moved in accordance with an opening-and-closing operation of the exterior cover 60) is disposed inside the exterior cover 60. When the exterior cover 60 is closed, the plurality of air supply ports C1, C2, C3, and C4 of the air supply duct 41 face openings of the image forming units 10Y, 10M, 10C, and 10K via the insertion ports 50Y, 50M, 50C, and 50K of the full-specification inner cover 50, respectively. Note that the positional relation of the full-specification inner cover 50, the air supply duct 41, and the stations X1, X2, X3, and X4 is not limited to the positional relation illustrated in FIG. 3A.

With reference to FIG. 3A, the plurality of exhaust ports D1, D2, D3, and D4 enable exhaust from the plurality of stations X1, X2, X3, and X4, respectively. The exhaust duct 42 causes the air exhausted from the plurality of exhaust ports D1, D2, D3, and D4 to flow toward the outside of the body of the image forming apparatus 1 via the outlet port B. Specifically, in the present embodiment, the four exhaust ports D1, D2, D3, and D4 are formed at positions (the upper side in FIG. 3A and the rear side in the direction perpendicular to the plane on which FIG. 1 is illustrated) facing the four image forming units 10Y, 10M, 10C, and 10K, respectively, in the exhaust duct 42. The exhaust duct 42 is provided with the exhaust fan 46 and the filter 47 on the downstream side (the left side in FIG. 3A) in the air flowing direction with respect to the plurality of exhaust ports D1, D2, D3, and D4. When the exhaust fan 46 is driven, the air in the exhaust duct 42 is positively discharged from the outlet B. The filter 47 collects toner (dust) and ozone and allows only clean air to pass therethrough. Such a configuration can reduce an inconvenience that scattered toner and ozone generated in the image forming units 10Y, 10M, 10C, and 10K float inside the image forming apparatus 1 and an inconvenience that the scattered toner and ozone are discharged to the outside the image forming apparatus 1. The positional relation of the upstream side and the downstream side between the exhaust fan 46 and the filter 47 in the exhaust duct 42 is not limited to that illustrated in FIG. 3A. The filter 47 may be disposed separately as an ozone filter and a dust filter (toner filter).

In the present embodiment, the air that has flowed into the stations X1, X2, X3, and X4 from the air supply ports D1, D2, D3, and D4 passes through the inside of the image forming units 10Y, 10M, 10C, and 10K (typically, spaces W surrounded by the dashed lines in FIG. 2) installed in the stations X1, X2, X3, and X4, and is exhausted from the exhaust ports D1, D2, D3, and D4, respectively. In other words, the air is released from the front side to the rear side in the image forming units 10Y, 10M, 10C, and 10K. Such a configuration can enhance the cooling performance of the image forming units 10Y, 10M, 10C, and 10K, and is likely to carry toner scattered from the developing device 13 and the ozone generated in the charging device 12 together with air flow, and thus, can enhance the collecting performance with respect to the toner and the ozone.

Figure 3B:
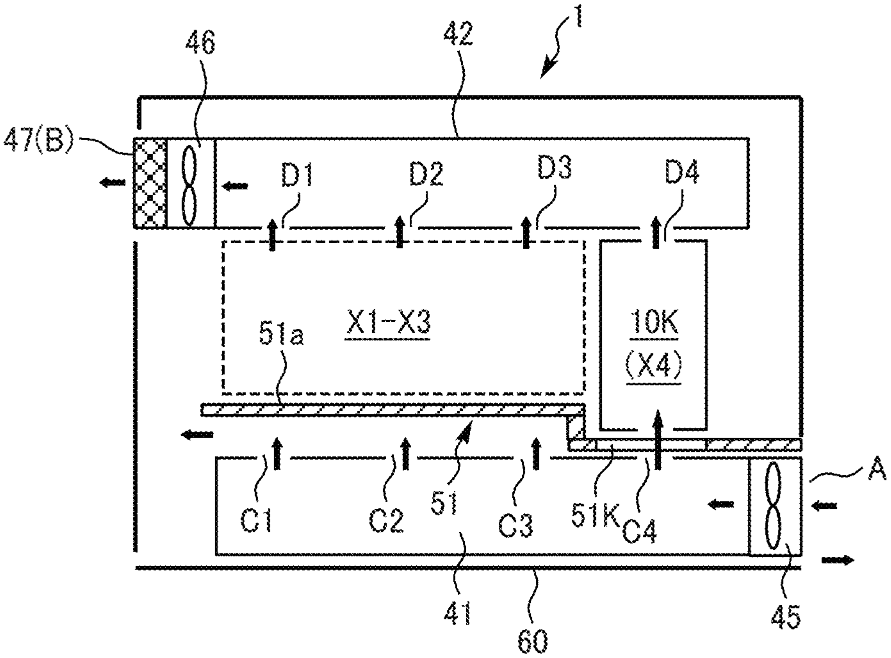
FIG. 3B is a top view of the image forming apparatus of FIG. 3A in a specified specification state, illustrating flows of air therein.
Figure 4B:
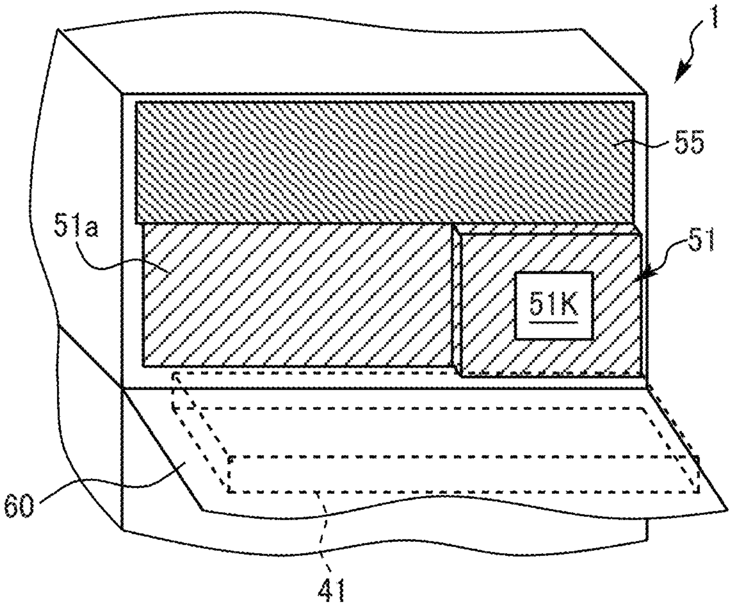
FIG. 4B is a perspective view of the image forming apparatus of FIG. 4A in which the body door is opened in a specified specification state.

The image forming apparatus 1 according to the present embodiment can perform image formation (printing) in a "full specification state" in which all of the plurality of (four) image forming units 10Y, 10M, 10C, and 10K are installed in the plurality of (four) stations X1, X2, X3, and X4 as illustrated in FIGS. 1, 3A, and 4A, or in a "specified specification state" in which the station X4 to be used, in which the image forming unit 10K is installed, and the unused stations X1, X2, and X3, in which the image forming units 10Y, 10M, and 10C are not installed, are present among the plurality of (four) stations X1, X2, X3, and X4 as illustrated in FIGS. 3B and 4B. The image forming apparatus 1 can switch the two states described above. In the present embodiment, the "specified specification state" is a state in which monochrome image formation (monochrome printing) can be performed using only the image forming unit 10K for black. Accordingly, the image forming apparatus 1 according to the present embodiment can be used by a user as a full-color image forming apparatus using four colors (Y, M, C, and K) or as a monochrome image forming apparatus using only black. Such a configuration can reduce the cost required for design and manufacturing compared to a case where a full-color image forming apparatus and a monochrome image forming apparatus are separately manufactured. Even when a user desires to change the image forming apparatus from a full-color image forming apparatus to a monochrome image forming apparatus or from a monochrome image forming apparatus to a full-color image forming apparatus, such a configuration can meet the desire of the user without much cost.

In the present embodiment, as illustrated in FIG. 3A, when image formation is performed in the "full specification state" (when the image forming apparatus 1 is used as the full-color image forming apparatus), air is supplied from all of the plurality of air supply ports C1, C2, C3, and C4 to all of the plurality of stations X1, X2, X3, and X4. When image formation is performed in the "full specification state" (when the image forming apparatus 1 is used as the full-color image forming apparatus), the exhaust is performed from all of the plurality of stations X1, X2, X3, and X4 to the exhaust duct 42 via the plurality of exhaust ports D1, D2, D3, and D4. In other words, in the "full specification state," air flows are formed as indicated by the black arrows in FIG. 3A. As a result, as described above, such a configuration can enhance the cooling performance (the performance of restricting the temperature rise) of the image forming units 10Y, 10M, 10C, and 10K, the collecting performance of toner scattered from the developing device 13, and the collecting performance of ozone generated in the charging device 12.

On the other hand, as illustrated in FIG. 3B, when image formation is performed in the "specified specification state" (when the image forming apparatus 1 is used as the monochrome image forming apparatus), air is supplied to the station X4 to be used (the image forming unit 10K for black) from the air supply port C4 corresponding to the station X4 to be used among the plurality of (four) air supply ports C1, C2, C3, and C4. Air is not supplied to the unused stations X1, X2, and X3 (the image forming units 10Y, 10M, and 10C for yellow, magenta, and cyan) via the other air supply ports C1, C2, and C3, and air is not exhausted from the unused stations X1, X2, and X3 (image forming units 10Y, 10M, and 10C for yellow, magenta, and cyan) via the other air supply ports C1, C2, and C3 (in other words, such that the air supply ports C1, C2, and C3 do not function as exhaust ports). When image formation is performed in the "specified specification state" (when used as a monochrome image forming apparatus 1), air is exhausted to the exhaust duct 42 through the exhaust port D4 corresponding to the station X4 to be used and through at least one exhaust port (e.g., all of the three exhaust ports D1, D2, and D3 in the present embodiment) of the plurality of exhaust ports D1, D2, and D3 corresponding to the plurality of unused stations X1, X2, and X3.

In the present embodiment, in the "specified specification state" (when used as a monochrome image forming apparatus 1), a shield 51*a* is removably installed as a shielding member that allows only the air supply port C4 corresponding to the station X4 to be used to communicate with the station X4 to be used (image forming unit 10K for black) and does not allow the other air supply ports C1, C2, and C3 to communicate with the unused stations X1, X2, and X3. The shield 51*a* (shielding member) is formed as a part of a specified-specification inner cover 51 (inner cover for the specified specification state) which is installed in place of the full-specification inner cover 50 (inner cover for the full specification state) in the specified specification state. In other words, in the "specified specification state" (when used as a monochrome image forming apparatus 1), the specified-specification inner cover 51 is removably installed, which allows only the air supply port X4 corresponding to the station C4 to be used to communicate with the station X4 to be used (image forming unit 10K for black) and does not allow the other air supply ports C1, C2, and C3 to communicate with the unused stations X1, X2, and X3. The shield 51*a* (shielding member) is formed such that one end (on the right side in FIG. 3B) contacts the image forming unit 10K for black with substantially no clearance, and an upper end contacts an intermediate-transfer inner cover 55 (see FIGS. 4A and 4B) with substantially no clearance, thereby separating a part or all of the stations X1, X2, and X3 in which the three image forming units 10Y, 10M, and 10C for yellow, magenta, and cyan can be installed, when viewed from the front side (the side on which the air supply duct 41 is disposed). With such a configuration, air is supplied from the air supply duct 41 only to the station X4 (the station to be used) corresponding to the image forming unit 10K for black among the four stations X1, X2, X3, and X4, and air is not supplied from the air supply duct 41 to the other stations X1, X2, and X3 (unused stations). The shield 51*a* (the specified-specification inner cover 51) is disposed on the front side of the image forming apparatus 1, and thus, the installation work (attachment and detachment operation) is simplified.

In the present embodiment, the shield 51*a* (shielding member) is formed such that air that has not been supplied to the station X4 to be used (image forming unit 10K for black) from the air supply port C4 corresponding to the station X4 to be used (image forming unit 10K for black), among the air that has flowed into the air supply duct 41 from the outside of the body of the image forming apparatus 1, can be exhausted to a side away from the plurality of stations X1, X2, X3, and X4. The air that has not been supplied to the station X4 to be used may be exhausted to the outside of the body of the image forming apparatus 1. Accordingly, in the specified specification state, the air flows as indicated by the black arrows in FIG. 3B are formed as a whole. As a result, as described above, such a configuration can enhance the cooling performance (the performance of restricting the temperature rise) of the image forming unit 10K for black, the collecting performance of toner scattered from the developing device 13 of the image forming unit 10K for black, and the collecting performance of ozone generated in the charging device 12 of the image forming unit 10K for black.

Specifically, as illustrated in FIG. 4B (and in FIG. 3B), in the specified specification state, no insertion ports for attachment and detachment of the image forming units 10Y, 10M, and 10C for yellow, magenta, and cyan are necessary. For this reason, the specified-specification inner cover 51 having only an insertion port 51K for attachment and detachment of the image forming unit 10K for black is installed instead of the full-specification inner cover 50 (full-specification inner cover). The specified-specification inner cover 51 includes the shield 51*a*. As described above, the air supply duct 41 is disposed inside the exterior cover 60. When the exterior cover 60 is closed, one air supply port C4 (an air supply port corresponding to the station X4 to be used) in the air supply duct 41 faces the opening of the image forming unit 10K for black via the insertion port 51K of the specified-specification inner cover 51. The air supply duct 41 is used in common in both the full specification state and the specified specification state. The specified-specification inner cover 51 as described above is installed, so that an inconvenience that the image forming units 10Y, 10M, and 10C are erroneously set in the unused stations X1, X2, and X3, respectively, in the specified specification state can be prevented.

As described above, in the present embodiment, even when image formation is performed in the full specification state or image formation is performed in the specified specification state, the attachment and detachment of one shield 51*a* (specified-specification inner cover 51) only can easily and efficiently reduce the temperature rise in the plurality of stations X1, X2, X3, and X4, and toner scatter and ozone discharge from the plurality of stations X1, X2, X3, and X4 to the outside of the image forming apparatus 1.

As illustrated in FIG. 3A, in the full specification state, a flow passage through which air passes from the front side to the rear side is formed in each of the four image forming units 10Y, 10M, 10C, and 10K. Thus, such a configuration can substantially uniformly enhance the cooling performance for all the image forming units 10Y, 10M, 10C, and 10K, the collecting performance of toner scattered from the developing device 13, and the collecting performance of ozone generated in the charging device 12.

Figure 5A:
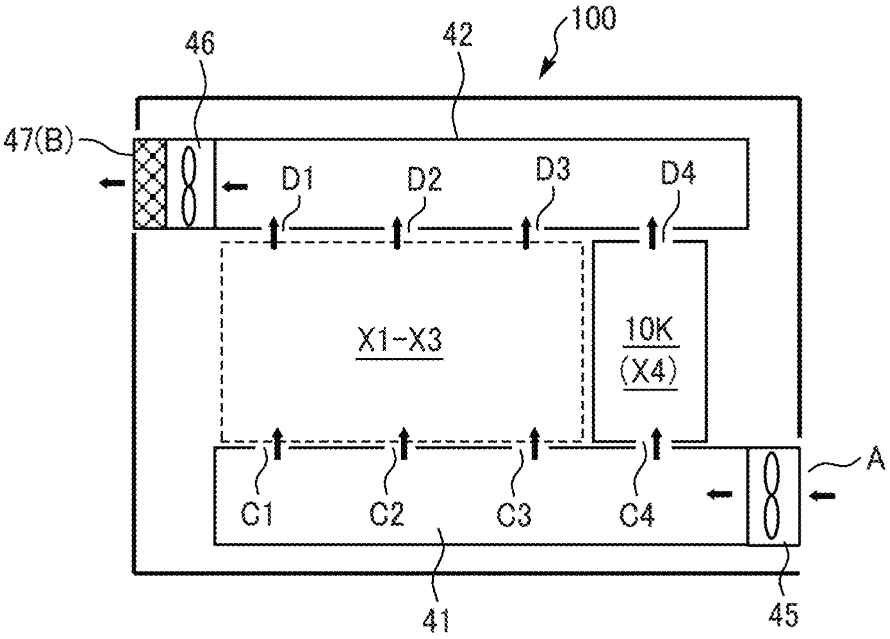
FIG. 5A is a top view of an image forming apparatus in a specified specification state according to a comparative example, illustrating flows of air therein.

As illustrated in FIG. 3B, in the specified specification state, a flow passage through which air passes from the front side to the rear side is formed only in the image forming unit 10K for black (station X4 to be used), and such flow passages are not formed in the other image forming units 10Y, 10M, and 10C (unused stations X1, X2, and X3). Thus, the cooling performance for the image forming unit 10K for black (station X4 to be used), the collecting performance of toner scattered from the developing device 13 of the image forming unit 10K for black, and the collecting performance of ozone generated in the charging device 12 of the image forming unit 10K for black can be enhanced compared to a case where such flow passages are formed in the unused stations X1, X2, and X3 as in an image forming apparatus 100 illustrated in FIG. 5A as a comparative example. In particular, when such a flow passage is formed also in the unused stations X1, X2, and X3 as in the image forming apparatus 100 illustrated in FIG. 5A as a comparative example, toner scattered from the developing device 13 of the image forming unit 10K for black flows as indicated by an arrow S in FIG. 2 and diffuses to the unused stations X1, X2, and X3 which are large spaces. Thus, the unused stations X1, X2, and X3 are contaminated with the scattered toner. In contrast, in the present embodiment, air is not supplied to the unused stations X1, X2, and X3 in the specified specification state, so that the occurrence of such an inconvenience is reduced.

Figure 5B:
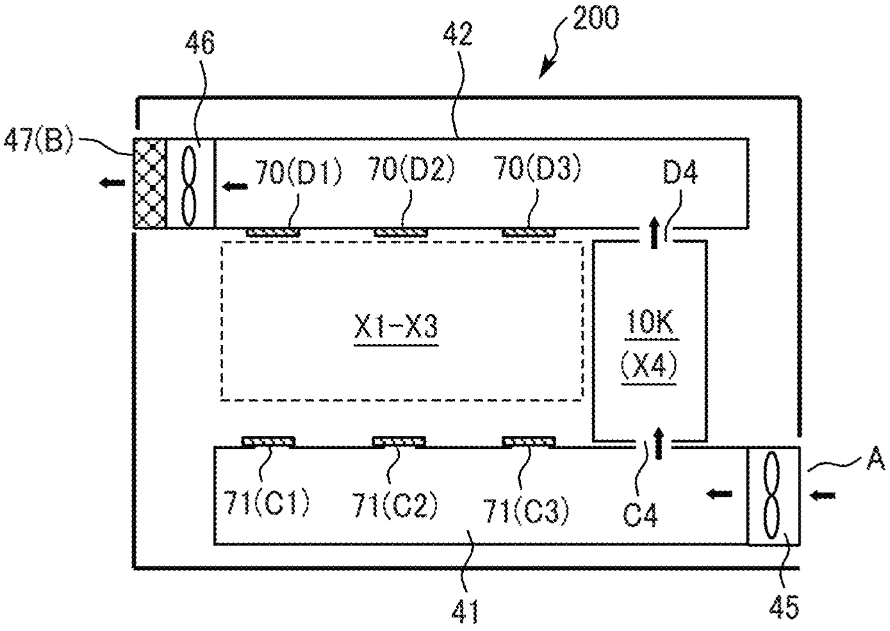
FIG. 5B is a top view of an image forming apparatus in a specified specification state according to a comparative example, illustrating flows of air therein.

On the other hand, as illustrated in FIG. 3B, in the specified specification state, similarly to the full specification state, not only the exhaust port D4 corresponding to the image forming unit 10K for black (station X4 to be used) but also all of the four exhaust ports D1, D2, D3, and D4 are left open. With such a configuration, the scattered toner generated in the developing device 13 of the image forming unit 10K for black (station X4 to be used) is less likely to flow to and stay in the unused stations, as compared with the case where, as in the image forming apparatus 200 illustrated in FIG. 5B as a comparative example, only the exhaust port D4 corresponding to the image forming unit 10K for black (the station X4 to be used) is opened and the exhaust ports D1, D2, and D3 of the unused stations X1, X2, and X3 are sealed by sealing members 70 (three air supply ports C1, C2, and C3 are also sealed by sealing members 71). In other words, in the present embodiment, scattered toner diffused from the station X4 to be used to the unused stations X1, X2, and X3 is discharged to the exhaust duct 42 via the exhaust ports D1, D2, and D3, and is finally collected by the filter 47. In order to obtain such an effect, all of the three exhaust ports D1, D2, and D3 corresponding to the unused stations X1, X2, and X3 do not need to be opened, and it is sufficient that at least one of the three exhaust ports D1, D2, and D3 is opened.

With reference to FIG. 3B, in the image forming apparatus 1 in the specified specification state, the air supply duct 41 and the inner cover 51 (inner cover for specified specification) are not completely in close contact with each other, but a slight clearance is provided therebetween. Even if air unexpectedly leaks from the air supply duct 41, such a configuration exhausts air to the outside of the image forming apparatus 1 through the clearance. As a result, the amount of air to be supplied to the image forming unit 10K for black can be optimized without control adjustment or replacement of the air supply fan 45. Further, the image forming apparatus 1 in the specified specification state according to the present embodiment is one in which the shield 51*a* (the specified-specification inner cover 51) is only installed when the image forming apparatus 1 is switched from the full specification state to the specified specification state. Thus, no time-consuming work occurs such as installing the sealing member 70 that seals each of the three exhaust ports D1, D2, and D3 or installing the sealing member 71 that seals each of the three air supply ports C1, C2, and C3 as in the image forming apparatus 200 illustrated in FIG. 5B as a comparative example.

Modification

Figure 6:
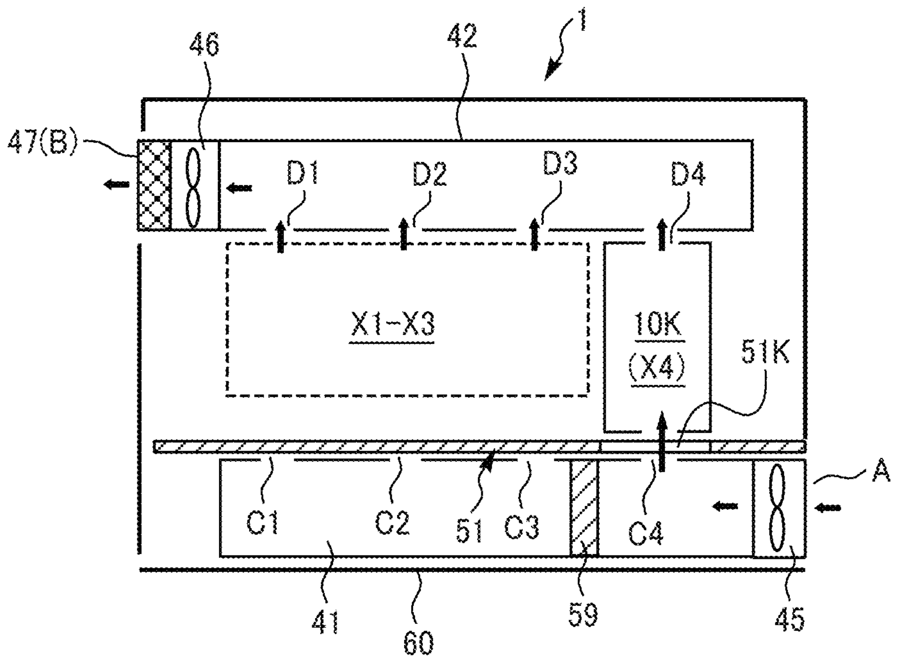
FIG. 6 is a top view of an image forming apparatus in a specified specification state according to a modification, illustrating flows of air therein.

As illustrated in FIG. 6, a partition 59 as a shielding member that divides the middle of the flow passage of the air supply duct 41 is removably installed in the image forming apparatus 1 according to a modification when printing is performed in a specified specification state (when used as a monochrome image forming apparatus 1). Specifically, the partition 59 (shielding member) is installed in the air supply duct 41 to block the flow passage at a position downstream from the air supply port C4 corresponding to the image forming unit 10K for black (station X4 to be used) and upstream from the air supply ports C1, C2, and C3 corresponding to the image forming units 10Y, 10M, and 10C for color (unused stations X1, X2, and X3). Even in such a configuration, air is supplied only from the air supply port C4 corresponding to the image forming unit 10K for black (station X4 to be used). Accordingly, also in the modification, such a configuration can easily and efficiently reduce the temperature rise in the plurality of stations X1, X2, X3, and X4 even when image formation is performed in the full specification state or even when image formation is performed in the specified specification state. In the case where the partition 59 (shielding member) is disposed in the air supply duct 41 in the specified specification state as described above, the specified-specification inner cover 51 (see FIG. 6) in which the shield 51*a* is not formed is installed instead of the full-specification inner cover 50.

As described above, the image forming apparatus 1 according to the present embodiment includes the plurality of stations X1, X2, X3, and X4 to and from which the plurality of image forming units 10Y, 10M, 10C, and 10K are attachable and detachable. The image forming apparatus 1 includes the plurality of air supply ports C1, C2, C3, and C4 that allow air to be supplied to the plurality of stations X1, X2, X3, and X4, the air supply duct 41 that allows air taken in from the outside of the body of the image forming apparatus 1 to flow toward the plurality of air supply ports C1, C2, C3, and C4, the plurality of exhaust ports D1, D2, D3, and D4 that allow air to be exhausted from the plurality of stations X1, X2, X3, and X4, and the exhaust duct 42 that allows air exhausted from the plurality of exhaust ports D1, D2, D3, and D4 to flow toward the outside of the body of the image forming apparatus 1. When image formation is performed in the full specification state in which all of the plurality of image forming units 10Y, 10M, 10C, and 10K are installed in the plurality of stations X1, X2, X3, and X4, air is supplied from all of the plurality of air supply ports C1, C2, C3, and C4 to all of the plurality of stations X1, X2, X3, and X4. On the other hand, when image formation is performed in the specified specification state in which the station X4 to be used in which the image forming unit 10K is installed and the unused stations X1, X2, and X3 in which the image forming units 10Y, 10M, and 10C are not installed are present among the plurality of stations X1, X2, X3, and X4, air is supplied to the station X4 to be used from the air supply port C4 corresponding to the station X4 to be used among the plurality of air supply ports C1, C2, C3, and C4. Air is not supplied to the unused stations X1, X2, and X3 via the other air supply ports C1, C2, and C3, and air is not exhausted from the unused stations X1, X2, and X3 via the other air supply ports C1, C2, and C3. Thus, such a configuration can simply and efficiently reduce temperature rise in the plurality of stations X1, X2, X3, and X4 even when image formation is performed in the full specification state or image formation is performed in the specified specification state.

In the image forming apparatus 1 according to the present embodiment, the image forming units 10Y, 10M, 10C, and 10K of four colors (Y, M, C, and K) are installed in the full specification state and one image forming unit 10K is installed in the specified specification state. However, the number of image forming units installed in the full specification state and the number of image forming units installed in the specified specification state are not limited to those in the present embodiment. For example, the number of image forming units installed in the full specification state may be five, which includes four for full color (Y, M, C, and K) and additional one for clear color or infrared. Further, the number of image forming units installed in the specified specification state may be three for color (Y, M, and C). In the present disclosure, the shapes of the air supply duct 41 and the exhaust duct 42, the positions of the air supply ports C1, C2, C3, and C4, and the positions of the exhaust ports D1, D2, D3, and D4 are not limited to those in the present embodiment. The image forming units 10Y, 10M, 10C, and 10K installed in the stations X1, X2, X3, and X4 are not limited to those of the present embodiment, and may be any image forming units that include at least the photoconductor drums 11 (image bearers), the charging devices 12 that charge the photoconductor drums 11, and the developing devices 13 that develop latent images formed on the surfaces of the photoconductor drums 11. Such a configuration can obtain an effect that enhances the collecting performance of toner scattered from the developing device 13 and the collecting performance of ozone generated in the charging device 12. Such cases can also provide substantially the same or similar effects as the effects described above.

In the present embodiment, any one of the full-specification inner cover 50 and the specified-specification inner cover 51 is installed as one component (inner cover) to face the plurality of stations X1, X2, X3, and X4. In other words, each of the full-specification inner cover 50 and the specified-specification inner cover 51 is formed as one component. In contrast, at least one of the full-specification inner cover 50 and the specified-specification inner cover 51 may be installed to face the plurality of stations X1, X2, X3, and X4 as one component (inner cover) in which a plurality of components (inner covers) are united. In other words, at least one of the full-specification inner cover 50 and the specified-specification inner cover 51 may be formed as one component (inner cover) in which a plurality of components (inner covers) are joined and united by screwing or snap-on clipping. Even in such a case, substantially the same effects as the effects in the present embodiment can be obtained.

Note that embodiments of the present disclosure are not limited to the above-described embodiments and it is apparent that the above-described embodiments can be appropriately modified within the scope of the technical idea of the present embodiment in addition to what is suggested in the above-described embodiments. Further, features of components of the embodiments, such as the number, the position, and the shape are not limited the embodiments and thus may be preferably set.

Note that aspects of the present disclosure may be, for example, a combination of the first to eighth aspects as follows.

First Aspect

An image forming apparatus (e.g., the image forming apparatus 1) includes a plurality of stations (e.g., the stations X1, X2, X3, and X4), a plurality of air supply ports (e.g., the air supply ports C1, C2, C3, and C4), an air supply duct (e.g., the air supply duct 41), a plurality of exhaust ports (e.g., the exhaust ports D1, D2, D3, and D4), and an exhaust duct (e.g., the exhaust duct 42). A plurality of image forming units (e.g., the image forming units 10Y, 10M, 10C, and 10K) are attachable to and detachable from the plurality of stations. The plurality of air supply ports supply air to the plurality of stations. The air supply duct allows air taken from an outside of a body of the image forming apparatus to flow toward the plurality of air supply ports. The plurality of exhaust ports exhaust air from the plurality of stations. The exhaust duct allows air exhausted from the plurality of air exhaust ports to flow toward the outside of the body of the image forming apparatus. When image formation is performed in a full specification state in which all of the plurality of image forming units are installed in the plurality of stations, air is supplied from all of the plurality of air supply ports to all of the plurality of stations. When image formation is performed in a specified specification state in which a station to be used in which one of the plurality of image forming units is installed and an unused station in which none of the plurality of image forming units is installed are present among the plurality of stations, air is supplied to the station to be used from an air supply port corresponding to the station to be used among the plurality of air supply ports, air is not supplied to the unused station via another air supply port, and air is not exhausted from the unused station via the other air supply port.

Second Aspect

In the image forming apparatus (e.g., the image forming apparatus 1) according to the first aspect, when image formation is performed in the full specification state, air is exhausted from all of the plurality of stations (e.g., the stations X1, X2, X3, and X4) to the exhaust duct (e.g., the exhaust duct 42) via the plurality of exhaust ports (e.g., the exhaust ports D1, D2, D3, and D4). When image formation is performed in the specified specification state, air is exhausted to the exhaust duct via one exhaust port corresponding to the station to be used and via at least one of the plurality of exhaust ports corresponding to the unused station.

Third Aspect

The image forming apparatus (e.g., the image forming apparatus 1) according to the first or second aspect includes, in the specified specification state, a shield (e.g., the shield 51*a*) is removably installed to cause only the air supply port corresponding to the station to be used to communicate with the station to be used and not to cause the other air supply port to communicate with the unused station.

Fourth Aspect

In the image forming apparatus (e.g., the image forming apparatus 1) according to the third aspect, the shield (e.g., the shield 51*a*) is formed such that air that has not been supplied to the station to be used from the air supply port corresponding to the station to be used, among the air that has been taken in the air supply duct (e.g., the air supply duct 41) from the outside of the body of the image forming apparatus, is exhausted to a side away from the plurality of stations (e.g., the stations X1, X2, X3, and X4) as it is.

Fifth Aspect

In the image forming apparatus (e.g., the image forming apparatus 1) according to any one of the first to fourth aspects, air that has flowed into the station from the air supply port passes through an inside of the image forming unit installed in the station, and is exhausted from the exhaust port of the station.

Sixth Aspect

In the image forming apparatus (e.g., the image forming apparatus 1) according to any one of the first to fifth aspects, the air supply duct (e.g., the air supply duct 41) is provided with an air supply fan (e.g., the air supply fan 45) upstream from the plurality of air supply ports (e.g., the air supply ports C1, C2, C3, and C4) in an air flow direction. The exhaust duct (e.g., the exhaust duct 42) is provided with an exhaust fan (e.g., the exhaust fan 46) and a filter (e.g., the filter 47) downstream from the plurality of exhaust ports (e.g., the exhaust ports D1, D2, D3, and D4) in the air flow direction.

Seventh Aspect

In the image forming apparatus (e.g., the image forming apparatus 1) according to any one of the first to sixth aspects, the image forming unit includes at least an image bearer (e.g., the photoconductor drum 11), a charging device (e.g., the charging device 12) that charges the image bearer, and a developing device (e.g., the developing device 13) that develops a latent image formed on a surface of the image bearer.

Eighth Aspect

In the image forming apparatus (e.g., the image forming apparatus 1) according to any one of the first to seventh aspects, the plurality of image forming units (e.g., the image forming units 10Y, 10M, 10C, and 10K) include an image forming unit for black and three image forming units for colors other than black. The specified specification state is a state in which monochrome image formation can be performed using only the image forming unit for black.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:

a plurality of image forming units;

a plurality of stations to and from which the plurality of image forming units are attachable and detachable;

a plurality of air supply ports through which air is supplied to the plurality of stations;

an air supply duct to cause air taken from an outside of a body of the image forming apparatus to flow toward the plurality of air supply ports;

a plurality of exhaust ports through which air is exhausted from the plurality of stations; and an exhaust duct to cause air exhausted from the plurality of exhaust ports to flow toward the outside of the body of the image forming apparatus, wherein, when image formation is performed in a full specification state in which all of the plurality of image forming units are installed in the plurality of stations, air is supplied from all of the plurality of air supply ports to all of the plurality of stations, and wherein, when image formation is performed in a specified specification state in which a station to be used in which one of the plurality of image forming units is installed and an unused station in which none of the plurality of image forming units is installed are present among the plurality of stations, air is supplied to the station to be used from an air supply port corresponding to the station to be used among the plurality of air supply ports, air is not supplied to the unused station via another air supply port among the plurality of air supply ports, and air is not exhausted from the unused station via said another air supply port.

2. The image forming apparatus according to claim 1, wherein, when image formation is performed in the full specification state, air is exhausted from all of the plurality of stations to the exhaust duct via the plurality of exhaust ports, and wherein, when image formation is performed in the specified specification state, air is exhausted to the exhaust duct via one exhaust port corresponding to the station to be used and via at least one of the plurality of exhaust ports corresponding to the unused station.

3. The image forming apparatus according to claim 1, further comprising a shield removably installed in the specified specification state, to cause only the air supply port corresponding to the station to be used to communicate with the station to be used and to stop said another air supply port to communicate with the unused station.

4. The image forming apparatus according to claim 3, wherein the shield is formed such that air that has not been supplied to the station to be used from the air supply port corresponding to the station to be used, among the air that has been taken in the air supply duct from the outside of the body of the image forming apparatus, is exhausted to a side away from the plurality of stations.

5. The image forming apparatus according to claim 1, wherein air that has flowed into the plurality of stations from the plurality of air supply ports passes through inside the plurality of image forming units installed in the plurality of stations and is exhausted from the plurality of exhaust ports of the plurality of stations.

6. The image forming apparatus according to claim 1, wherein the air supply duct is provided with an air supply fan upstream from the plurality of air supply ports in an air flow direction, and wherein the exhaust duct is provided with an exhaust fan and a filter downstream from the plurality of exhaust ports in the air flow direction.

7. The image forming apparatus according to claim 1, wherein each image forming unit of the plurality of image forming units includes at least an image bearer, a charging device to charge the image bearer, and a developing device to develop a latent image formed on a surface of the image bearer.

8. The image forming apparatus according to claim 1, wherein the plurality of image forming units include an image forming unit for black and three image forming units for colors other than black, and wherein the specified specification state is a state in which monochrome image formation is performed using only the image forming unit for black.

* * * * *